US008167348B2

(12) United States Patent
Fesenmyer

(10) Patent No.: US 8,167,348 B2
(45) Date of Patent: May 1, 2012

(54) CABLE ACTIVATED LATCH PAWL FOR FLOOR CONSOLE ARMREST

(75) Inventor: Christopher Emery Fesenmyer, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 12/728,685

(22) Filed: Mar. 22, 2010

(65) Prior Publication Data

US 2011/0227359 A1 Sep. 22, 2011

(51) Int. Cl.
*B60R 7/04* (2006.01)

(52) U.S. Cl. .................................... 296/24.34; 296/1.09

(58) Field of Classification Search ............... 296/24.34, 296/37.8, 1.09; 297/188.19
See application file for complete search history.

(56) References Cited

U.S. PATENT DOCUMENTS 4,934,750 A 6/1990 Eichler et al.
5,845,965 A * 12/1998 Heath et al. .............. 297/188.19
6,003,927 A 12/1999 Korber et al.
6,419,314 B1 * 7/2002 Scheerhorn .............. 297/188.19
6,435,587 B1 * 8/2002 Flowerday et al. .......... 296/37.8
6,719,367 B2 4/2004 Mic et al.
7,004,527 B2 2/2006 Niwa et al.
7,029,049 B2 * 4/2006 Rockafellow et al. ....... 296/37.8
7,192,070 B2 * 3/2007 Radu et al. ................. 296/24.34
7,264,291 B2 * 9/2007 Radu et al. ................. 296/24.34
7,431,365 B2 * 10/2008 Sturt et al. ................. 296/24.34
7,731,258 B2 * 6/2010 Bazinski et al. ............ 296/37.8
7,770,953 B2 * 8/2010 Koarai ....................... 296/24.34
7,878,567 B2 * 2/2011 Schneider et al. ......... 296/24.34
8,002,323 B2 * 8/2011 Jones et al. .................. 296/37.1
2006/0279123 A1 12/2006 Bazinski et al.
2007/0262632 A1 11/2007 Cody et al.

FOREIGN PATENT DOCUMENTS

JP 2009126304 A * 6/2011

* cited by examiner

*Primary Examiner* — Jason S Morrow
(74) *Attorney, Agent, or Firm* — Shook, Hardy & Bacon LLP

(57) ABSTRACT

An armrest assembly for pivotable attachment to a vehicle floor console includes a first sliding armrest having a latch, a second sliding armrest having a latch, a console pawl for engagement with a pawl receptacle formed in the console, a first cable connecting the latch of the first sliding armrest to the console pawl, and a second cable connecting the latch of the second sliding armrest to the console pawl. The assembly further includes a first ratchet rack and a first ratchet pawl connected to the latch of the first armrest and a second ratchet rack and a second ratchet pawl connected to the latch of the second armrest. Operation of a latch releases both the console pawl and the associated ratchet pawl simultaneously to allow sliding movement of the armrest or pivoting movement of the armrest assembly with respect to the floor console.

13 Claims, 7 Drawing Sheets

10 14 11 12 24 22 16

19
54
16
58
56
12
56
52
53
44
22
17
18

54
19
11
58
56
56
42
56
56
50
14
12

19
54
16
60
17
50
68
14
70
24
18'

CABLE ACTIVATED LATCH PAWL FOR FLOOR CONSOLE ARMREST

TECHNICAL FIELD

The disclosed invention relates generally to a floor console for a vehicle having a movable cover. More particularly, the disclosed invention relates to a floor console having a pivoting cover with a pair sliding armrests attached to the cover.

BACKGROUND OF THE INVENTION

In the automotive vehicle passenger compartment it is common to provide a console between the driver and front passenger seats, for example, between bucket seats. The console has many functions. In addition to operating as an armrest and as a cup holder, the console can house various items such as cassette tapes, small tools, maps, and the like.

In general, four types of center consoles are known. The first of these is the console that opens on one side. This sort of console often limits access only to the driver of the vehicle. Insofar as it is common today for the same vehicle platform to be sold in several countries, the side opening console suitable for the left-hand drive vehicle may not be suitable for use in the right-hand drive vehicle.

In partial response to the problem created by the console that opens on one side only, there is a second type of console, one that opens on two sides. While providing access to occupants of both front seats, the console that opens on two sides is often burdened by a complex and thus expensive to build and install dual-hinge system.

A third type of console opens from the front and is thus accessible to both front seat occupants. While this arrangement responds at least in part to the difficulties raised by both the single side-opening and dual side-opening consoles, it is not readily accessible to rear-seat passengers.

The fourth type of console, the top-opening console, is provided in response to the limitations of the three aforementioned consoles. For at least the identified reasons the console which opens from the top has become increasingly popular given its convenience and functionality. In addition to providing a cover for the storage bin, a top surface of the cover is often used as an armrest for occupants seated next to the console.

The typical top-opening console includes a latch device of some type and the type depends on whether the top is hingedly attached to the console or is slidingly attached to the console. The latch for the hinged top is usually a simple spring-loaded hinged latch, which is moved by the operator from the latched position to the unlatched position by applying finger pressure to the latch mechanism. While requiring only a simple latch mechanism, the hinged top is designed to provide easy access to the driver while restricting access to either the front seat passenger.

Thus the sliding console top is popular but ordinarily requires a more complex latch arrangement. The most common latch arrangement for the sliding top utilizes a cam and spring to actuate latch engagement pawls from the side of the armrest and bin. While being operational, this design is complicated and adds to higher manufacturing and assembly costs.

Accordingly, as in so many areas of automotive technology, there is room in the art of sliding console latch designs for an alternative method and apparatus for effectively and simply providing a locking latch.

SUMMARY OF THE INVENTION

The disclosed invention provides an alternative arrangement to known latch systems for sliding covers for consoles. The arrangement includes a console cover assembly pivotably attached to a console base. The cover assembly includes a base, a first armrest having a latch, a first ratchet rack attached to the base, a first ratchet pawl attached to the first armrest, and a first cable connecting the latch of the first armrest and the first ratchet pawl. The cover assembly further includes a second armrest having a latch, a second ratchet rack attached to the base, a second ratchet pawl attached to the second armrest, and a second cable connecting the latch of the second armrest and the first ratchet pawl. A single console pawl is attached to the console cover assembly for selective engagement with a console pawl receptacle on the console base. A first cable connects the latch of the first armrest with the pawl and a second cable connects the latch of the second armrest with the same pawl.

In operation, movement of a latch releases the associated armrest for sliding movement with respect to the base and simultaneously allows for release of the console cover assembly from the console base.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
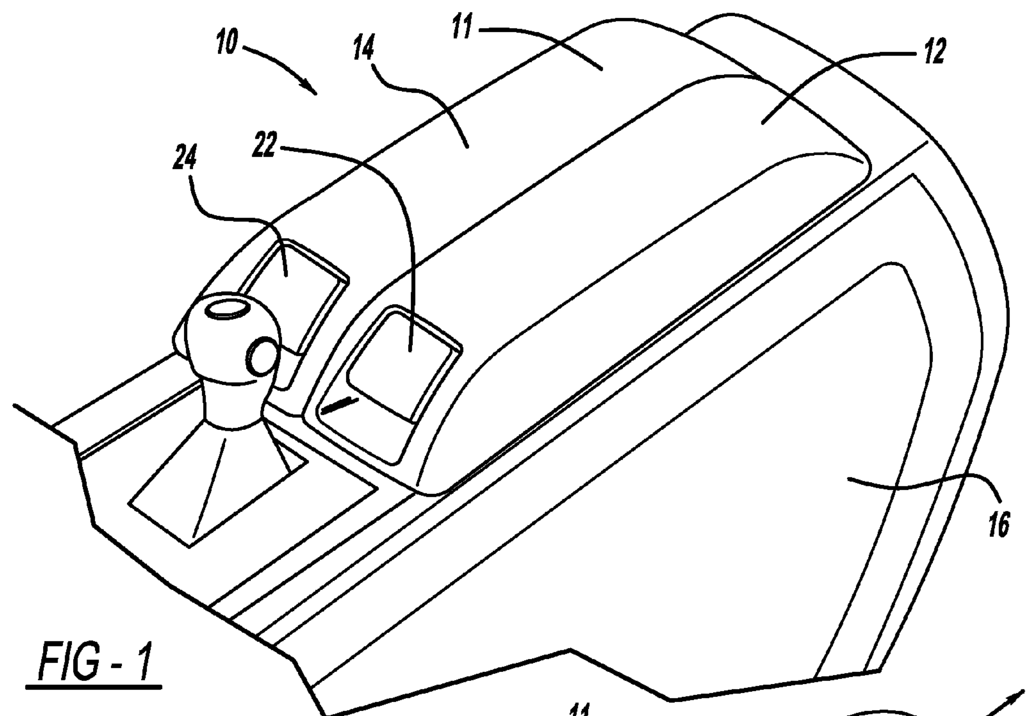
FIG. 1 is a perspective view of a console according to the disclosed invention showing dual sliding armrests in their closed positions.

In the following figures, the same reference numerals will be used to refer to the same components. In the following description, various operating parameters and components are described for different constructed embodiments. These specific parameters and components are included as examples and are not meant to be limiting.

Figure 2:
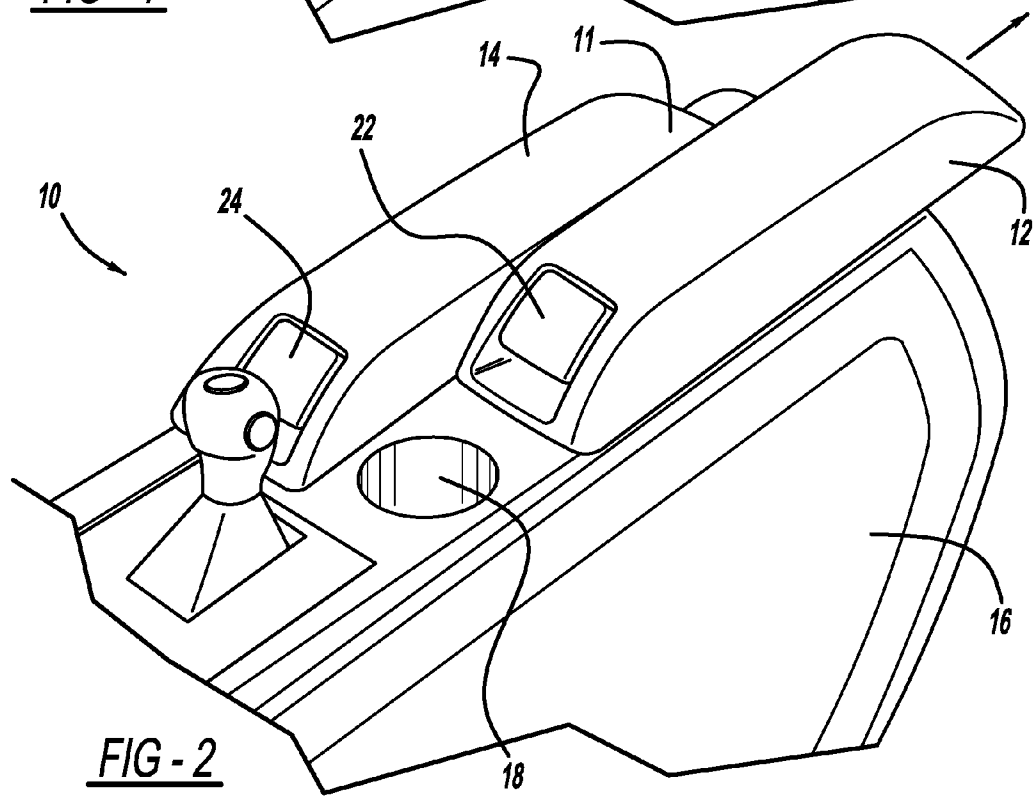
FIG. 2 is a view similar to that of FIG. 1 but showing one of the sliding armrests in its open position.
Figure 3:
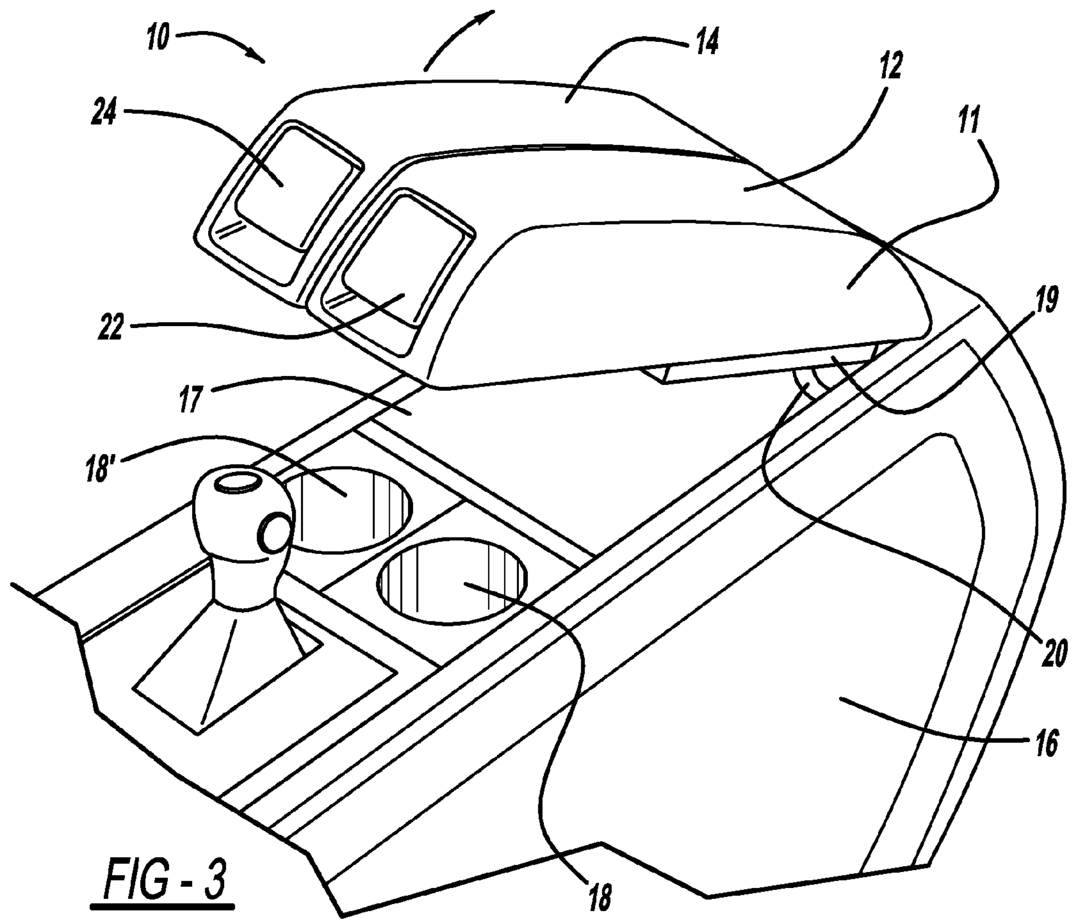
FIG. 3 is a view similar to that of FIG. 1 but showing the console cover assembly in its raised position.

With reference to FIGS. 1 through 3, a console incorporating the latch mechanism of the disclosed invention is illustrated generally as 10. It is to be understood that the console 10 as illustrated is only suggestive and many variations of the console 10 are possible without deviating from the spirit and scope of the disclosed invention. Accordingly, the overall configuration and appearance of the console 10 is suggestive only and is not to be interpreted as being exclusive or otherwise limiting.

The console 10 is of the type that is normally positioned between adjacent seats, such as bucket seats (not shown). Ordinarily the console 10 is adapted for use between adjacent front seats but it is also known to use center seat consoles in the rear seat, such as in some trucks and sport utility vehicles.

The console 10 includes a console cover assembly 11 which includes a pair of sliding side-by-side armrests, and specifically includes a first armrest 12 and a second armrest 14. The sliding armrests 12 and 14 are disposed on the top of the console cover assembly 11. The console cover assembly 11 is pivotably attached to a console body 16. The console body 16 may be wholly or partially hollow so as to provide a storage space for items such as maps and the like.

The sliding armrests 12 and 14 slide forward and rearward to provide both the driver and the passenger access to the storage space within the console body 16 as is known in the art. The sliding armrests 12 and 14 are shown in their forward or closed positions in FIG. 1.

In FIG. 2 the first sliding armrest 12 has been moved vehicle rearward to its open position. Thus positioned the sliding armrest 12 gives access to a portion of the console body 16. In this case there is provided a first cup holder 18. With the first sliding armrest 12 having been moved to a rearward position access to the first cup holder 18 is now available. (A second cup holder 18' is shown in FIG. 3.)

In FIG. 3 the console cover assembly 11 is shown moved to its open position such that the vehicle occupants have access to a console bin 17 defined within the console body 16. The illustrated shape and configuration of the bin 17 is illustrative only and is to be taken as suggestive and not limiting.

The console cover assembly 11 includes a base 19 and a hinge 20 operatively associated with the console body 16 in a known manner. The first sliding armrest 12 and the second sliding armrest 14 are attached to the base 19 as will be explained below.

Again, the arrangement shown in FIGS. 1 through 3 and discussed with reference thereto is only exemplary and it is to be understood that other like configurations may be adapted.

Each of the sliding covers 12 and 14 is fitted with a release latch as is known. Particularly, the first sliding cover 12 is fitted with a release latch 22 and the second sliding cover 14 is fitted with a release latch 24. The configuration and placement of the release latches 22 and 24 is only suggestive and many variations may be contemplated.

Figure 4:
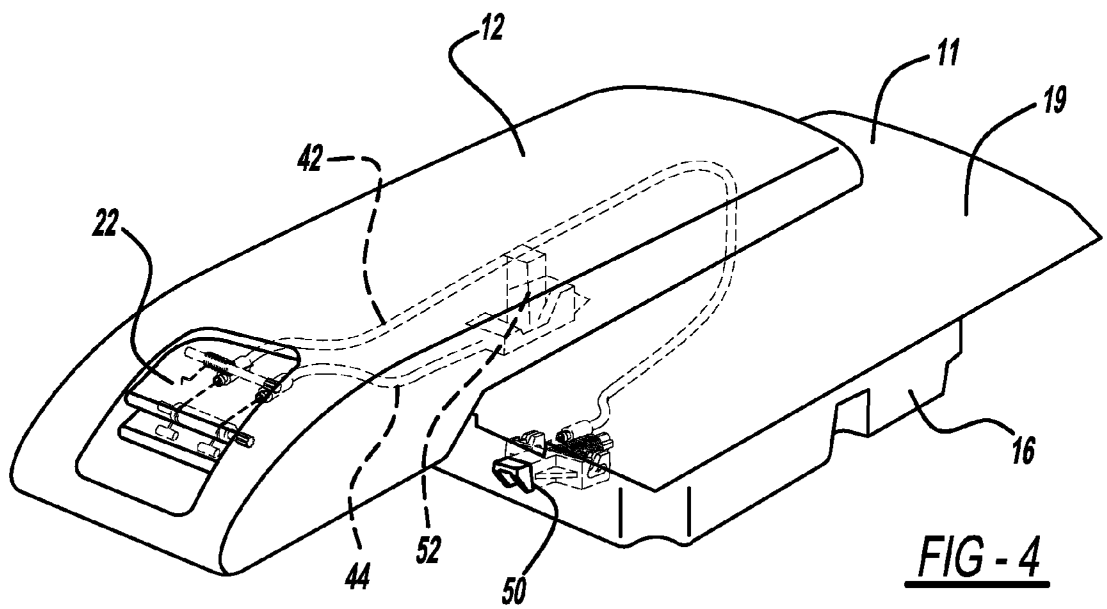
FIG. 4 is an isometric view of a single armrest and a portion of the console illustrating the cable and latch arrangement in partial broken lines.
Figure 5:
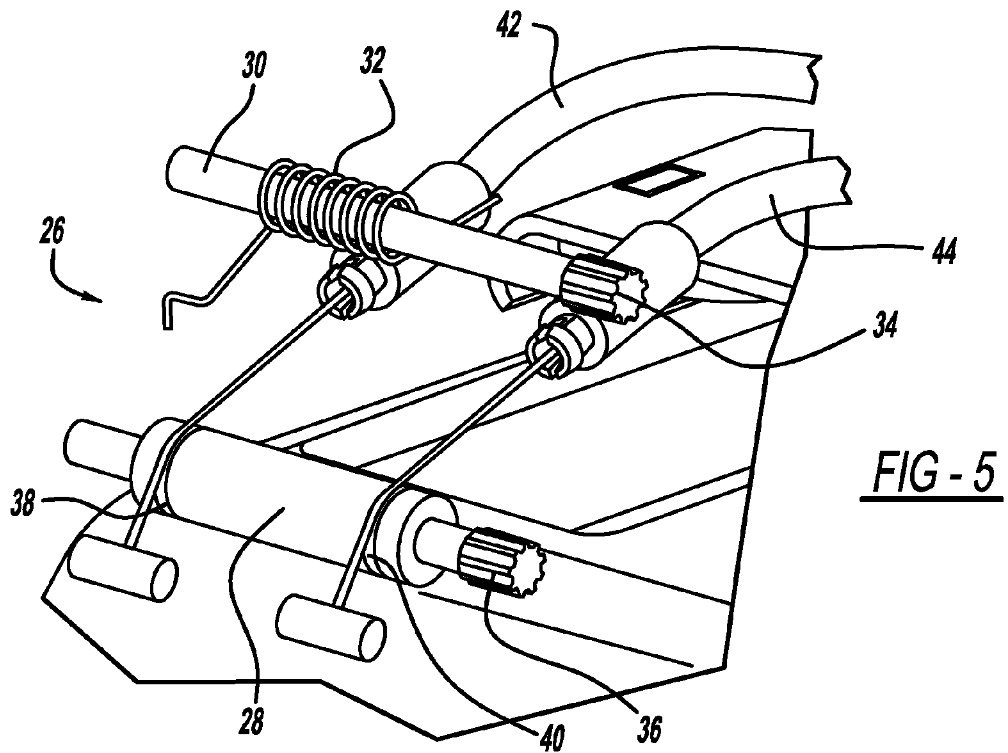
FIG. 5 is a view of the latch end of the latch cables and their associated spring-loaded roller assemblies of the disclosed invention.

The latches 22 and 24 are each connected to a cable and each of the cables is connected to a single retractable pawl as will now be described. With reference to FIG. 4 an isometric view of one of the armrests is shown. For the sake of simplicity reference shall be made to the first armrest 12 although the same arrangement exists with respect to the second armrest 14. FIG. 5 illustrates a detailed view of latch 22 and of the associated spring-loaded roller assemblies of the disclosed invention. The latch 22 is pivotably attached to the armrest 12. Associated with the latch 22 is a cable guide assembly 26, best illustrated in FIG. 5. The cable guide assembly 26 includes a rotatable guide shaft 28 and a rotatable shaft 30 having a return spring 32. The rotatable shaft 30 has a gear 34 which is indirectly operatively engaged with a gear 36 formed at the end of the rotatable guide shaft 28.

Peripherally defined in the rotatable guide shaft 28 is a pair of cable guide grooves 38 and 40. The grooves 38 and 40 respectively guide the latch ends of each of a pair of cables 42 and 44. In operation, the user lifts the latch 22 which pulls upon the cables 42 and 44. The latch 22 is urged to its illustrated resting state by the return spring 32 as is understood by those skilled in the art.

Figure 9:
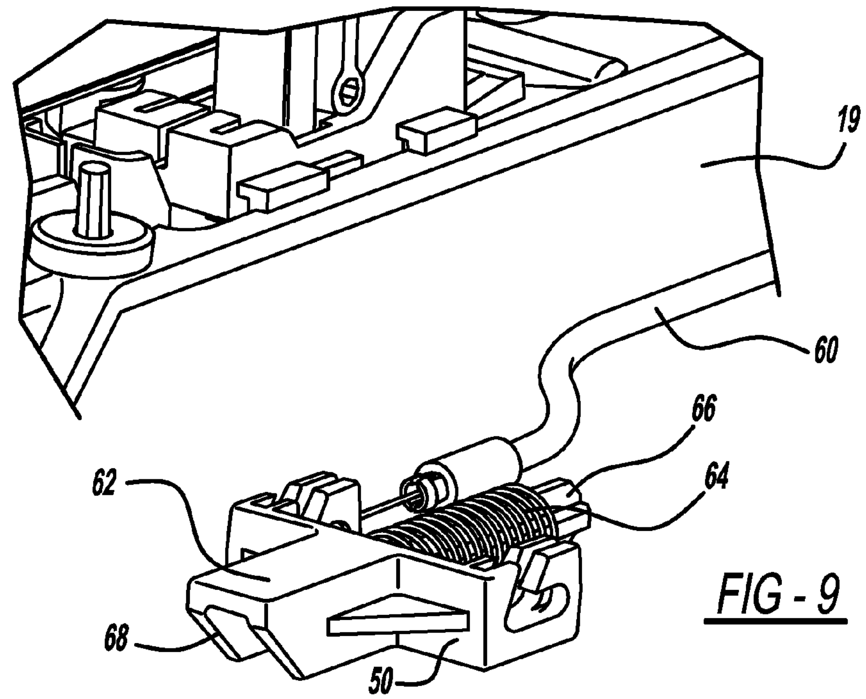
FIG. 9 is an isometric view of the pawl and a portion of the associated cable and operating mechanism.
Figure 8:
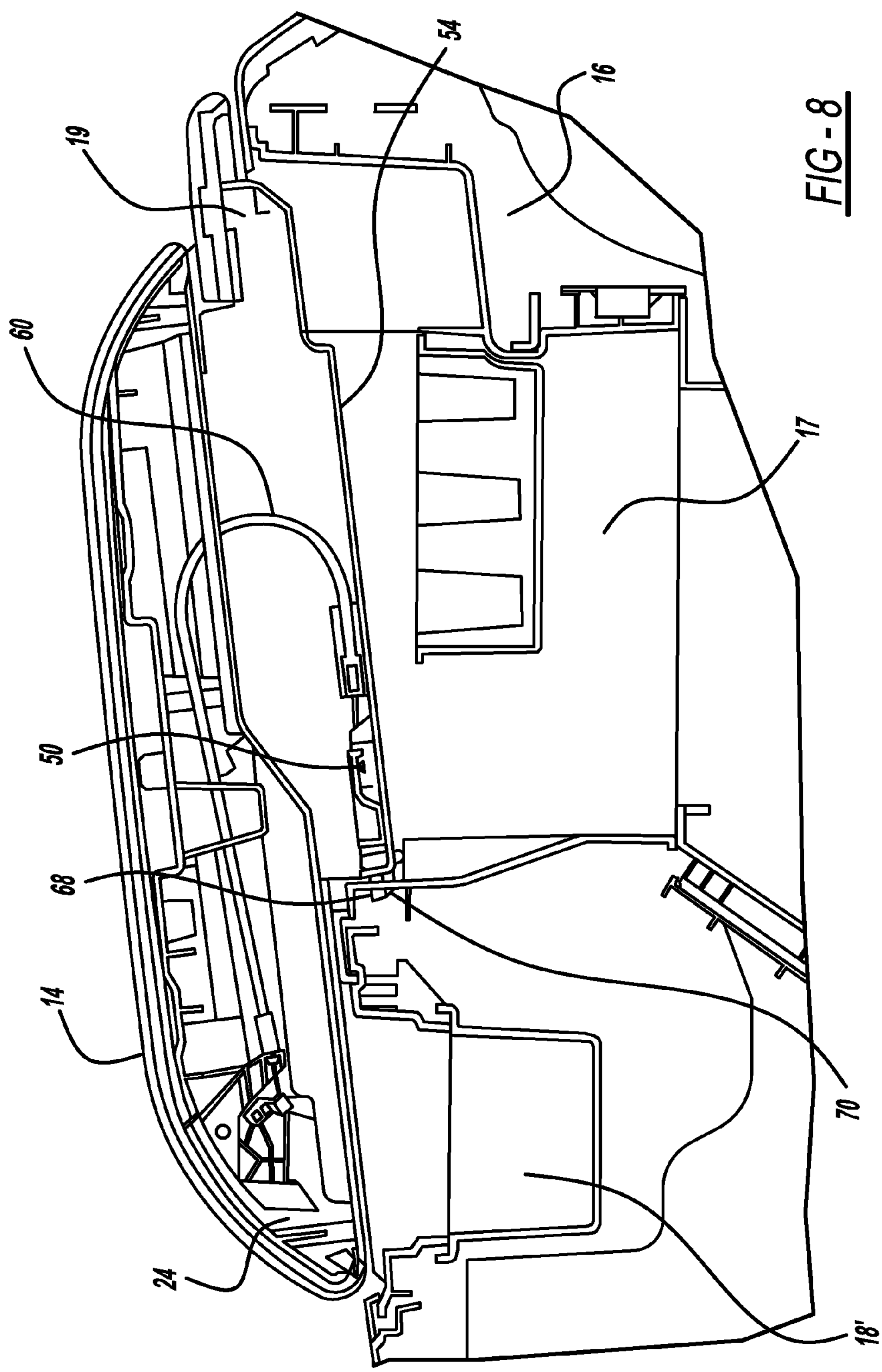
FIG. 8 is sectional view similar to that of FIG. 6 but illustrating instead the console cover pawl and an associated cable.

One of the cables, specifically cable 42, is operatively associated with a retractable console pawl assembly 50, illustrated in FIG. 4. The retractable console pawl assembly 50 is illustrated in FIGS. 8 and 9 and its construction and operation will be discussed below in detail in conjunction with those figures.

Figure 6:
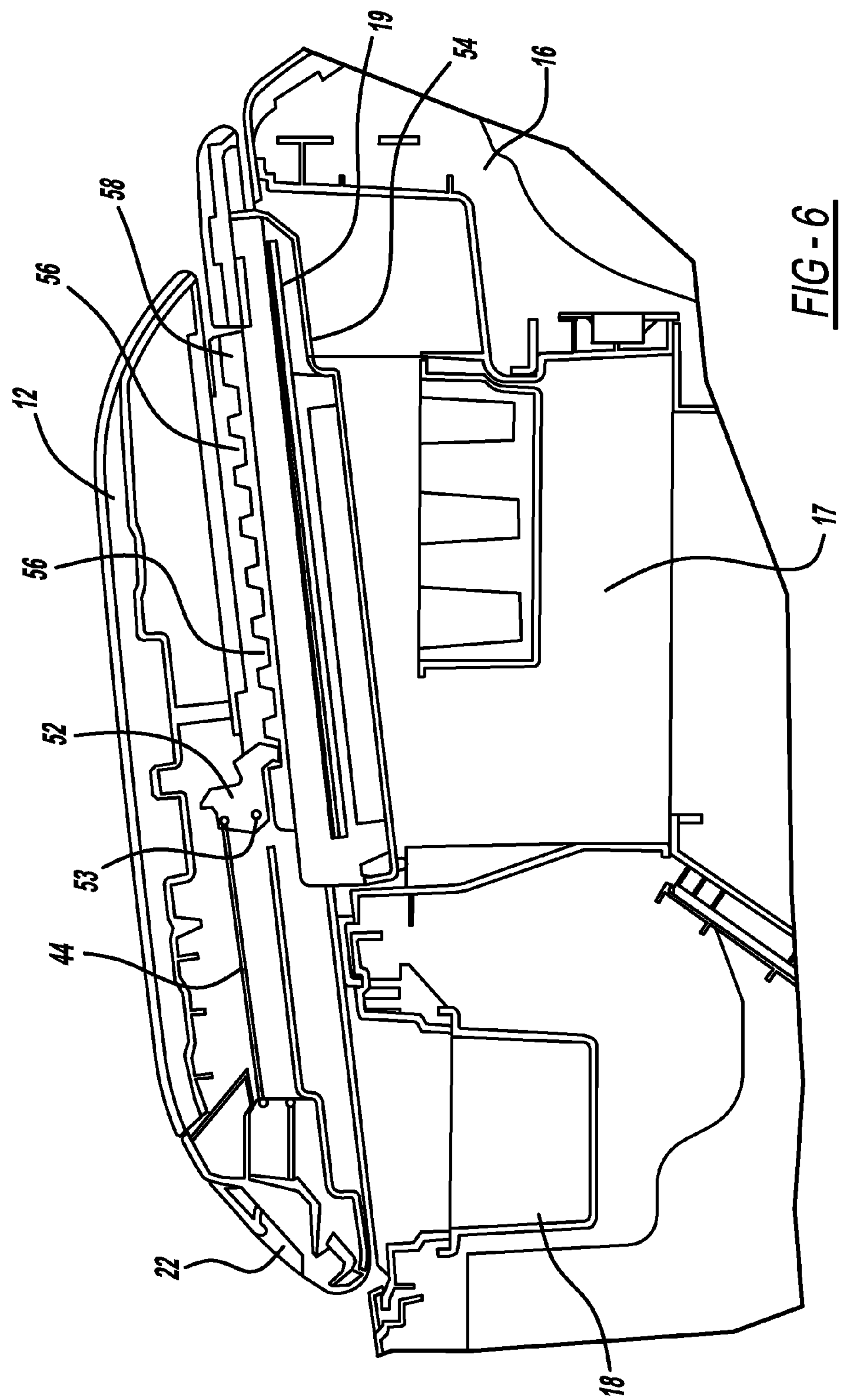
FIG. 6 is sectional view of the console according to the disclosed invention particularly illustrating a ratchet rack and its associated ratchet pawl.
Figure 7:
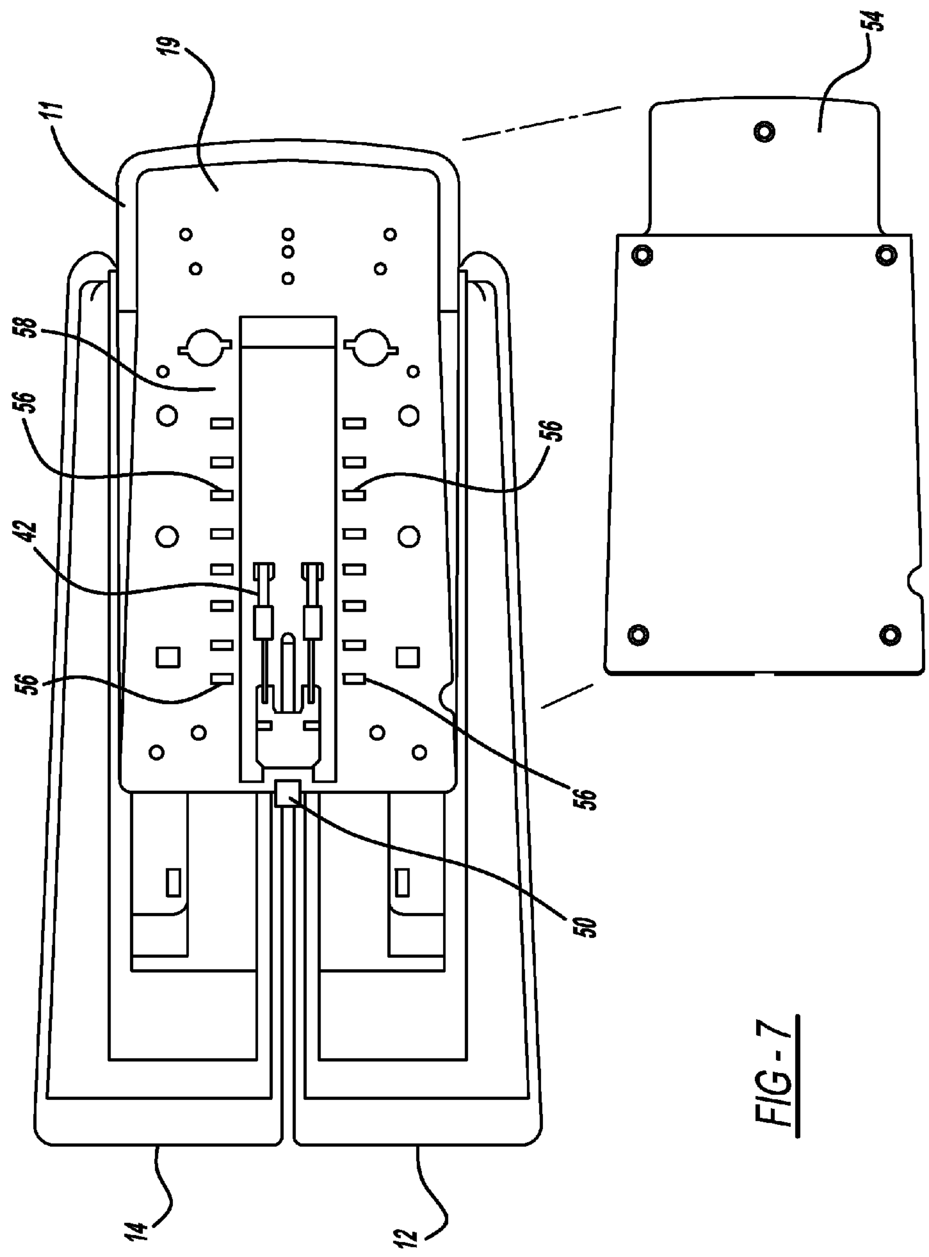
FIG. 7 is a plan view of the underside of the console cover assembly with the cover removed and spaced apart therefrom.

The other of the two cables, specifically cable 44, is operatively associated with a ratchet pawl 52. The ratchet pawl 52 is pivotably attached with the armrest 12 by a pivot point 53. FIGS. 6 and 7 illustrate the ratchet pawl 52 and its associated structures. FIG. 6 is a sectional view of the console body 16 and the armrest 12. FIG. 7 is a plan view of the underside of the console cover assembly 11. The base 19 of the console cover assembly 11 includes a base cover 54. In FIG. 7 the base cover 54 is shown removed from the base 19.

The armrest 12 (and the armrest 14, not shown in FIG. 6) is slidingly attached to the base 19 of the console cover assembly 11 in a known manner using a rack system. The armrest 12 may be selectively moved forward and backward to different locations relative to the base 19. The position of the armrest 12 relative to the base 19 is determined by engagement of the ratchet pawl 52 with one of a series of pawl-receiving slots 56 formed in a ratchet rack 58. The ratchet rack 58 is part of the base 19. In operation, when the seat occupant lifts the latch 22 upward to its release position the latch 22 pulls upon the cable 44 (as well as the cable 42) which translates motion to the ratchet pawl 52, causing it to pivot on its pivot point 53 and thus releasing it from engagement with one of the pawl-receiving slots 56 of the ratchet rack 58. Fore and aft movement of the armrest 12 is thus possible. Reengagement of the ratchet pawl 52 with a pawl-receiving slot 56 occurs when the operator releases the latch 22 to its resting and engaged position.

While construction and operation of the armrest 12 has been described it is to be understood that construction and operation of the armrest 14 is identical to that of the armrest 12.

When the seat occupant (not shown) lifts the latch 22 the console cover assembly 11 as a whole may be rotated away from the console body 16 thus allowing access to the console bin 17. The cable 42 and its relationship with the latch 22 and the retractable console pawl assembly 50 have been previously described with respect to FIGS. 4 and 5. FIGS. 8 and 9 provide further details with respect to this construction and operation. FIG. 8 is a sectional view of the console body 16 and console cover assembly 11 but instead illustrates a sectional view of the armrest 14 and sectioning a portion of the retractable console pawl assembly 50. FIG. 9 is an isometric view of the retractable console pawl assembly 50.

As noted before, each of the armrests 12 and 14 has a cable to its associated ratchet pawl (the cable 44 of the armrest 12) and a console pawl (the cable 42 of the armrest 12). The armrest 14 has two cables as well, one for its associated ratchet pawl (not shown) and one for the console pawl which is cable 60.

The retractable console pawl assembly 50 includes a pawl body 62 and a return spring 64. The return spring 64 is fitted to a shaft 66 extending from an end of the pawl body 62.

Attached to the opposite end of the pawl body 62 is a pawl plunger 68. The pawl plunger 68 is provided for operative engagement with a pawl-plunger receiving slot 70 formed in the forward end of the console bin 17 of the console body 16.

Figure 10:
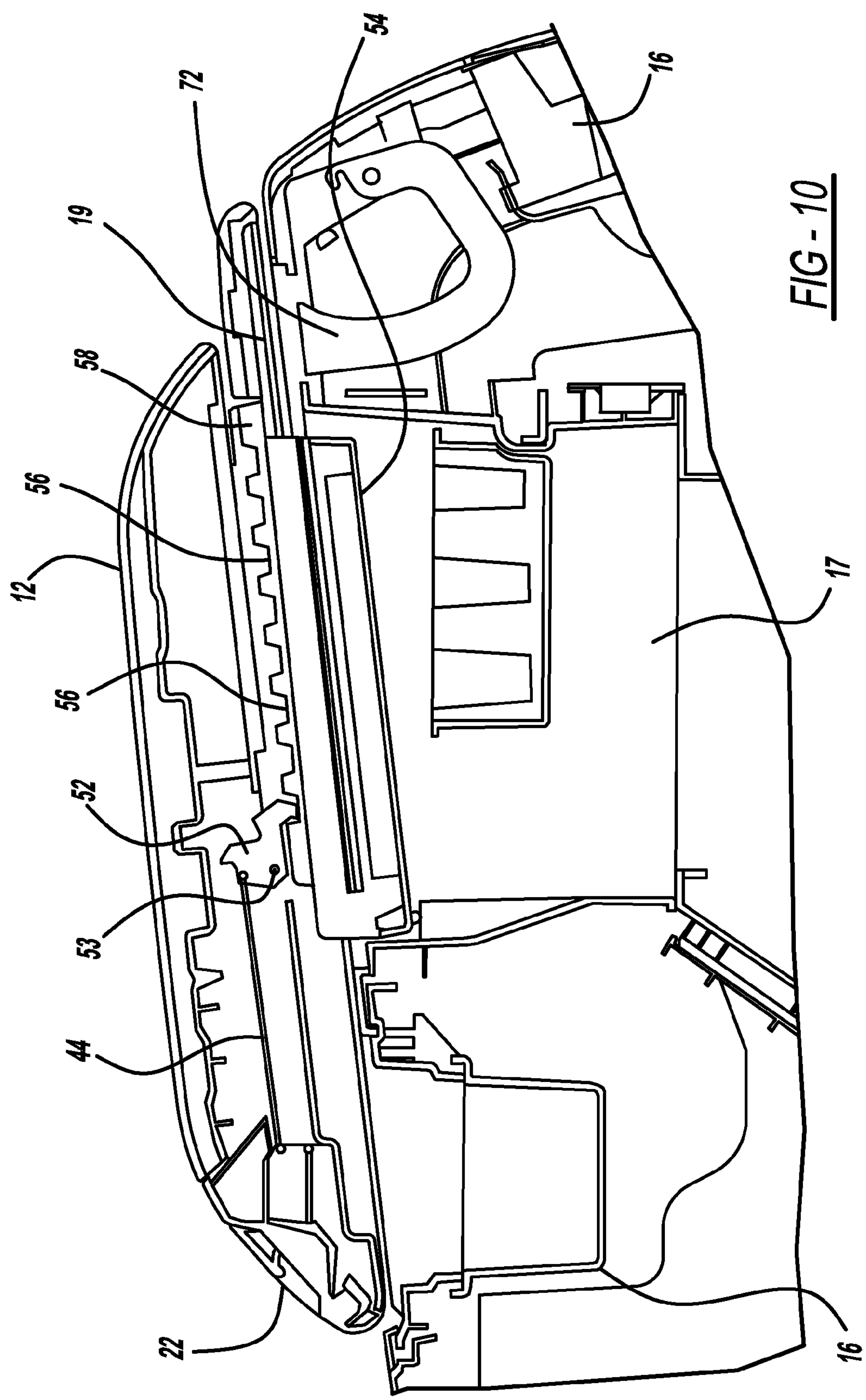
FIG. 10 is a sectional view similar to that of FIG. 6 but showing the hinge mechanism connecting the console cover assembly to the console body.

When the seat occupant (not shown) lifts the latch 24 the cable 60 associated with the latch 24 translates motion to the retractable console pawl assembly 50, pulling it away from the pawl-plunger receiving slot 70 and releasing the console cover assembly 11 for pivoting motion away from the console body 16. The pivoting motion of the console cover assembly 11 is made possible by any number of known pivoting mechanisms. FIG. 10 illustrates one such arrangement wherein a pivoting arm 72 connects the base 19 of the console cover assembly 11 and the console body 16 in a known manner. An identical pivoting arm (not shown) is provided on the opposite side of the assembly.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A cover assembly for a vehicle console comprising:

a base pivotably attached to the console;

a pair of ratchet racks and ratchet pawls;

a pair of armrests slidably attached to the base, each armrest having a latch and a cable connecting the latch to one of the ratchet pawls; and a console pawl attached by a first cable to one of the latches and attached by a second cable to the other of the latches.

2. The cover assembly of claim 1 wherein each ratchet rack of said pair of ratchet racks is aligned side-by-side with the other and wherein said pair of ratchet racks is fitted to said base.

3. A console for a vehicle comprising:

a compartment having a pawl receptacle; and a cover pivotably attached to said compartment, said cover including:

a base, a first armrest slidably attached to said base, said first armrest having a first latch, a second armrest slidably attached to said base, said second armrest having a second latch, a pair of retractable pawls that engage with a pair of ratchet racks to control sliding of the first armrest and the second armrest; and a console pawl that engages with the pawl receptacle, the console pawl attached to the first latch and to the second latch by respective cables.

4. The console of claim 3 wherein said console pawl is provided for selective engagement with said pawl receptacle.

5. The console of claim 3 further including a first ratchet rack and a first ratchet pawl operatively associated with said first armrest and a second ratchet rack and a second ratchet pawl operatively associated with said second armrest.

6. The console of claim 5 further including a first cable connecting said first latch and said first ratchet pawl and a second cable connecting said second latch and said second ratchet pawl.

7. The console of claim 5 wherein said first ratchet rack and said second ratchet rack are connected to said base.

8. The console of claim 3 wherein said console pawl includes a single pawl plunger and wherein each of said first and second cables is attached to said single pawl plunger.

9. A cover assembly for a vehicle console comprising:

a base pivotably attached to the console;

a first armrest slidably attached to the base and having a first latch, a first ratchet rack and a first ratchet pawl being associated with the base and the first armrest;

a first cable connecting said first latch and said first ratchet pawl;

a second armrest slidably attached to the base and having a second latch, a second ratchet rack and a second ratchet pawl being associated with the base and the second armrest;

a second cable connecting said second latch and said second ratchet pawl;

a console pawl;

a third cable connecting said first latch and said console pawl; and a fourth cable connecting said second latch and said console pawl.

10. The cover assembly of claim 9 wherein said first ratchet rack and said second ratchet rack are attached to said base.

11. The cover assembly of claim 10 wherein said first ratchet rack is aligned side-by-side with said second ratchet rack on said base.

12. The cover assembly of claim 9 wherein said first ratchet pawl is pivotably attached to said first armrest and said second ratchet pawl is pivotably attached to said second armrest.

13. The console of claim 9 wherein said console pawl includes a single pawl plunger and wherein each of said third and fourth cables is attached to said single pawl plunger.

* * * * *